US006443356B1

(12) United States Patent
Leicht

(10) Patent No.: US 6,443,356 B1
(45) Date of Patent: Sep. 3, 2002

(54) METHOD FOR CONTROLLING HEAT TRANSFER TO A WORK PIECE DURING CONDENSATION SOLDERING

(76) Inventor: Helmut W. Leicht, Messerschmittring 61, D-86343 Königsbrunn (DE)

( * ) Notice: Subject to any disclaimer, the term of this patent is extended or adjusted under 35 U.S.C. 154(b) by 0 days.

(21) Appl. No.: 09/719,668

(22) PCT Filed: Jun. 15, 1999

(86) PCT No.: PCT/EP99/04134

§ 371 (c)(1),
(2), (4) Date: Feb. 2, 2001

(87) PCT Pub. No.: WO99/65634

PCT Pub. Date: Dec. 23, 1999

(51) Int. Cl.[7] .......................... B23K 31/02; B23K 35/38
(52) U.S. Cl. .................................. 228/234.2; 228/219
(58) Field of Search .................... 228/218, 219, 228/233.2, 234.1, 234.2, 262.1

(56) References Cited

U.S. PATENT DOCUMENTS

| | | | |
|---|---|---|---|
| 3,866,307 A | * | 2/1975 | Pfahl, Jr. et al. |
| 4,077,467 A | * | 3/1978 | Spigarelli |
| 4,115,601 A | * | 9/1978 | Ammann et al. |
| 4,238,186 A | * | 12/1980 | Pfahl, Jr. |
| 4,264,299 A | * | 4/1981 | Ammann et al. |
| 4,389,797 A | * | 6/1983 | Spigarelli et al. |
| 4,679,721 A | * | 7/1987 | Kondo |
| 4,692,114 A | * | 9/1987 | Waldron et al. |
| 4,801,069 A | * | 1/1989 | Ankrom et al. |
| 4,802,276 A | * | 2/1989 | Bowcutt et al. |
| 4,840,305 A | * | 6/1989 | Ankrom et al. |
| 4,909,429 A | * | 3/1990 | Ankrom et al. |
| 4,975,300 A | * | 12/1990 | Deviny |
| 5,038,496 A | | 8/1991 | Mishina et al. .............. 34/78 |
| 5,381,945 A | * | 1/1995 | Leicht |
| 5,542,596 A | | 8/1996 | Cimbak ................. 228/234.2 |
| 5,817,217 A | * | 10/1998 | Garidel |

FOREIGN PATENT DOCUMENTS

| | | | | |
|---|---|---|---|---|
| FR | 2537912 | | 6/1984 | ........... B23B/11/00 |
| JP | 401122663 A | * | 5/1989 | |
| WO | WO 98/41352 | | 9/1998 | ........... B23K/1/015 |

OTHER PUBLICATIONS

Derwent (2000–000594) Leicht.*

* cited by examiner

Primary Examiner—M. Alexander Elve
Assistant Examiner—Kiley Stoner
(74) Attorney, Agent, or Firm—Ohlandt, Greeley, Ruggiero & Perle, LLP; George W. Rauchfuss, Jr.

(57) ABSTRACT

The invention relates to a process for controlling the heat transfer to a workpiece during vapor phase soldering. According to said process, a workpiece placed in a vapor phase is first rapidly heated to a predetermined temperature, and then the temperature is controlled by changing the vapor volume on the workpiece surface. Preferably, a workpiece in the vapor phase is heated to a temperature lower than the melting point of the solder, and then the workpiece is heated at the boundary between the vapor phase and the vapor-free space more slowly to the melting point of the solder. This invention is advantageous in that it provides a process for rapid vapor phase soldering with no undesirable side effects, such as, e.g., formation of solder pearls.

18 Claims, 1 Drawing Sheet

Figure 1:
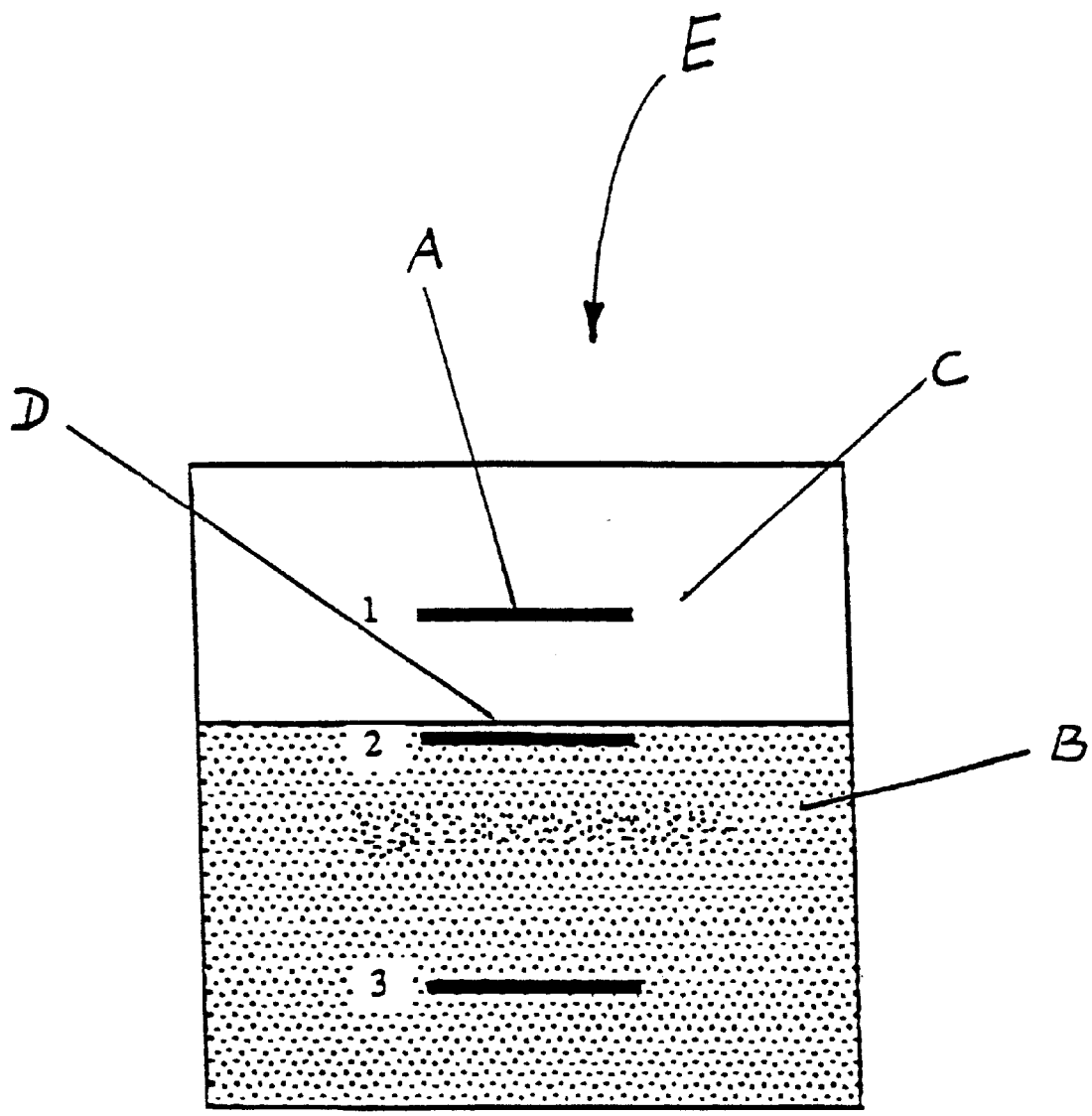

METHOD FOR CONTROLLING HEAT TRANSFER TO A WORK PIECE DURING CONDENSATION SOLDERING

The invention relates to a process for controlling the heat transfer to a workpiece during vapor phase soldering.

During vapor phase soldering the parts to be soldered are rapidly heated when being immersed into the saturated vapor layer. Re-melting the solder for the purpose of soldering can also take place very rapidly. As a consequence, there are often unpleasant side effects such as, for example, the generation of solder pearls if solder paste is re-melted too rapidly on a printed circuit board. It is therefore desirable to slow down the rapid heat transfer in the vapor phase in order to be able to heat the parts to be soldered more slowly.

It is known that during vapor phase soldering a slow heat transfer can be achieved in that a workpiece with the part to be soldered is allowed to immerse only into the surface area of the vapor phase. Thus, the vapor condenses mainly from the bottom and only to a small extent from the top of the part to be soldered. Normally, the workpiece is held in the upper position of the vapor phase until the solder paste melts slowly. Only then is it further moved down in the vapor phase in order to well heat the soldering joints of all components, so that the solder can well moisten all parts to be soldered.

A difficulty of the known method is, however, that it is true that the heat transfer takes place more slowly but consequently also the soldering process is prolonged considerably. Although the actual soldering process can be over after, e.g., 30 seconds, in the known process a printed circuit board is held for, e.g., 180 seconds in the upper area of the vapor phase in order to be able to re-melt slowly. Thus, problems arise in processes having a critical process time, which can lead to increased costs.

WO 98/41352 discloses a process for heat-treating workpieces, in particular for the hot-connection of electronic components or printed circuit boards with hot vapor in a treatment device comprising at least one vapor generator. In this process the workpieces are heated with vapor in a controllable manner. In this respect, vapor generation is controlled as a function of the amount of heat required to produce the desired temperature gradient in the workpieces.

In contrast thereto, it is an object of the present invention to provide a process for controlling the heat transfer to a workpiece during vapor phase soldering, in which a more rapid heat transfer takes place without the mentioned disadvantageous side effects, and in which the temperature of the workpiece can be adjusted in a narrow temperature range.

The object is achieved with the features of the claims.

In achieving this object, the invention starts out from the basic idea of rapidly heating a workpiece in the vapor phase up to a predetermined temperature usually lying below the melting temperature of the solder and then controlling the temperature by changing the vapor amount above the workpiece, wherein the solder slowly heats up to its melting temperature, preferably by reducing the vapor amount.

The present invention relates in particular also to the heat transfer at the boundary between vapor phase and vapor-free space.

The invention starts out from the fact that the vapor amount generated per time unit is a controlled variable for the heat transfer speed. If this vapor amount per time unit is appropriately dimensioned, the entire vapor volume above the part to be soldered condenses on top of it when this part is immersed into the vapor phase. This leads to a correspondingly rapid temperature increase. On the part to be soldered at most as much vapor can be condensed as the part to be soldered takes up heat per time unit. The vapor amount must be dimensioned such that the amount present corresponds to the amount which can condense when the part to be soldered is introduced into the vapor phase. In this case the vapor volume condenses on the part to be soldered and the upper boundary of the vapor layer is located at the contact level of the part to be soldered. If the temperature of the part to be soldered increases, less vapor can condense on it and the vapor layer rises over the part to be soldered. Thus, vapor can again condense from the top, which leads in turn to a more rapid temperature increase in the part to be soldered. If more vapor is available (or if it is produced in such a short period of time) than can directly condense when the part is immersed into the vapor phase, also the boundary of the vapor layer is located above the part to be soldered, and the maximum heat transfer to the part to be soldered is achieved from all sides. In this case the slow heating process according to the present invention cannot be applied since the delayed heat transfer is based on the fact that during the slow heat transfer the vapor condenses mainly only below the part to be soldered.

The present invention is advantageous in that it provides a rapid and economical process for vapor phase soldering and an exact control of the workpiece temperature.

In the following the invention will be explained in more detail on the basis of the single FIGURE in which FIG. 1 is a schematic representation of a process chamber for vapor phase soldering.

In the lower area of a process chamber E for vapor phase soldering there is provided the vapor phase B which, above the boundary D, is adjoined by a vapor-free space C. From a position 1, a workpiece A can be introduced into the positions 2 and/or 3 for being soldered in the vapor phase B.

In the process according to the invention, after being introduced the workpiece A to be soldered is lowered from the position 1 into the position 3 in the vapor phase B. The vapor volume above the part to be soldered condenses on the part to be soldered, and from the bottom the condensation takes place by newly generated vapor. When the part to be soldered has reached a predetermined temperature, the workpiece is moved upwards so that condensation from the bottom is reduced, depending on how rapidly the vapor phase, which comes from the bottom, follows the part to be soldered. How fast the vapor phase follows mainly depends on the vapor amount which the system is able to generate per time unit. By means of different positions 2, 3 of the workpiece A, it is possible to maintain a predetermined workpiece temperature, to let the workpiece cool down again or to allow a slow temperature increase.

In a preferred process, the workpiece A is lowered from the position 1 in the vapor-free space C into the vapor phase B to position 3. In this position the workpiece is rapidly heated to a temperature below the melting temperature of the solder. Then the workpiece is moved upwards to the position 2 at the boundary D of the vapor phase B. In this position the workpiece is further heated mainly from its bottom surface so that the melting temperature of the solder is slowly reached, wherein a smooth soldering operation without undesired side effects is achieved. Then the workpiece A can leave the vapor phase B or can move further down for being heated further. The speed with which workpiece A is being heated further when it is moved to position 2 is determined by the speed of the upward motion and the amount of vapor being produced per time unit.

By moving the workpiece down or up in the region of position 2, the temperature of the part to be soldered can be kept in a narrow temperature range, e.g., when it is moved slightly down at a temperature of below 170° C. and slightly up at a temperature of more than 170° C. so that basically a temperature of 170° C. is adjusted.

I claim:

1. A process for controlling the heat transfer to a workpiece (A) having a surface during vapor phase soldering, wherein the workpiece (A) is first rapidly heated in a vapor phase (B) to a predetermined temperature, and then the temperature is controlled by varying the vapor amount at the surface of the workpiece, wherein a predetermined temperature of the workpiece (A) is adjusted by moving the workpiece (A) up or down in the vapor phase (B) and wherein heating speed of the workpiece (A) is determined by the amount of vapor produced per unit time and by the position of the workpiece (A) in the vapor phase (B).

2. The process according to claim 1 comprising the steps of
   (a) lowering the workpiece (A) from a position (1) in the vapor-free space (C) into the vapor phase (B) to a position (3) in which the workpiece (A) is completely surrounded by the vapor phase,
   (b) heating the workpiece (A) to a predetermined temperature by condensation of the vapor phase (B), and
   (c) moving the workpiece (A) upwards to not higher than a position (2) at a boundary (D) between the vapor phase (B) and the vapor-free space (C).

3. The process according to claim 2, characterized in that in step (b) the predetermined temperature of the workpiece (A) lies below the melting temperature of the solder and that in step (c) the melting temperature of the solder is reached.

4. The process according to claim 2, characterized in that in step (c) the workpiece (A) is moved upwards at different speeds.

5. The process according to claim 4, characterized in that in step (c) the workpiece (A) is moved upwards to a position (2) at the boundary (D).

6. The process according to claim 4, characterized in that in step (b) the predetermined temperature of the workpiece (A) lies below the melting temperature of the solder and that in step (c) the melting temperature of the solder is reached.

7. The process according to claim 2, characterized in that in step (c) the workpiece (A) is moved upwards to a position (2) at the boundary (D).

8. The process according to claim 7, characterized in that in step (b) the predetermined temperature of the workpiece (A) lies below the melting temperature of the solder and that in step (c) the melting temperature of the solder is reached.

9. The process according to claim 1, characterized in that the predetermined temperature is 170° C.

10. A process for controlling the heat transfer to a workpiece (A) having a surface during vapor phase soldering, wherein the workpiece (A) is first rapidly heated in a vapor phase (B) to a predetermined temperature, and then the temperature is controlled by varying the vapor amount at the surface of the workpiece, the process comprising the steps of:
    (a) lowering the workpiece (A) from a position (1) in a vapor-free space (C) into the vapor phase (B) to a position (3) in which the workpiece (A) is completely surrounded by the vapor phase,
    (b) heating the workpiece (A) to a predetermined temperature by condensation of the vapor phase (B), and
    (c) moving the workpiece (A) upwards to not higher than a position (2) at a boundary (D) between the vapor phase (B) and the vapor-free space (C).

11. The process according to claim 10 wherein in step (c) the workpiece (A) is moved upwards at different speeds.

12. The process according to claim 11 wherein in step (c) the workpiece (A) is moved upwards to the position (2) at the boundary (D).

13. The process according to claim 10 wherein the predetermined temperature of the workpiece (A) is adjusted by moving the workpiece (A) down or up in the vapor phase (B).

14. The process according to claim 13 wherein the predetermined temperature is 150° C.

15. The process according to claim 10 wherein in step (b) the predetermined temperature of the workpiece (A) lies below the melting temperature of the solder and that in step (c) the melting temperature of the solder is reached.

16. The process according to claim 11 wherein in step (b) the predetermined temperature of the workpiece (A) lies below the melting temperature of the solder and that in step (c) the melting temperature of the solder is reached.

17. The process according to claim 12 wherein in step (b) the predetermined temperature of the workpiece (A) lies below the melting temperature of the solder and that in step (c) the melting temperature of the solder is reached.

18. A process for controlling the heat transfer to a workpiece (A) having a surface during vapor phase soldering, wherein the workpiece (A) is first rapidly heated in a vapor phase (B) to a predetermined temperature, and then the temperature is controlled by varying the vapor amount at the surface of the workpiece, wherein heating speed of the workpiece (A) is determined by the amount of vapor produced per unit time and by the position of the workpiece (A) in the vapor phase (B).

* * * * *